United States Patent

Endo

[11] Patent Number: 5,923,125
[45] Date of Patent: Jul. 13, 1999

[54] VEHICULAR DISCHARGE LAMP LIGHTING CIRCUIT DEVICE FOR CONTROLLING A PLURALITY OF HEAD LAMP FUNCTIONS

[75] Inventor: Yukihiko Endo, Shizuoka, Japan

[73] Assignee: Koito Manufacturing Co., Ltd., Tokyo, Japan

[21] Appl. No.: 08/896,173

[22] Filed: Jul. 17, 1997

[30] Foreign Application Priority Data

Jul. 19, 1996 [JP] Japan .................................. 8-191227

[51] Int. Cl.⁶ .................................................. H05B 37/00
[52] U.S. Cl. ............................ 315/82; 315/363; 315/77; 15/250.002; 307/10.8
[58] Field of Search ................... 15/250.02; 355/82, 355/363, 77; 307/10.8

[56] References Cited

U.S. PATENT DOCUMENTS

| | | | |
|---|---|---|---|
| 4,713,583 | 12/1987 | Hochstein | 315/82 |
| 4,870,545 | 9/1989 | Hatanaka et al. | 315/82 |
| 5,068,570 | 11/1991 | Oda et al. | 315/128 |
| 5,140,229 | 8/1992 | Yagi et al. | 315/307 |
| 5,142,203 | 8/1992 | Oda et al. | 315/308 |
| 5,151,631 | 9/1992 | Oda et al. | 315/127 |
| 5,212,428 | 5/1993 | Sasaki et al. | 315/308 |
| 5,278,452 | 1/1994 | Matsumoto et al. | 307/10.8 |
| 5,295,036 | 3/1994 | Yagi et al. | 361/79 |
| 5,422,548 | 6/1995 | Yamashita et al. | 315/308 |
| 5,449,973 | 9/1995 | Yamashita et al. | 315/82 |
| 5,465,029 | 11/1995 | Hanazaki et al. | 315/82 |
| 5,485,059 | 1/1996 | Yamashita et al. | 315/307 |
| 5,486,740 | 1/1996 | Yamashita et al. | 315/308 |
| 5,497,058 | 3/1996 | Fujigaya | 15/250.002 |
| 5,514,935 | 5/1996 | Oda et al. | 315/82 |
| 5,526,242 | 6/1996 | Takahashi et al. | 362/83.3 |
| 5,565,743 | 10/1996 | Yamashita et al. | 315/310 |
| 5,572,094 | 11/1996 | Yamashita et al. | 315/308 |

FOREIGN PATENT DOCUMENTS

| | | |
|---|---|---|
| 0 507 273 A1 | 10/1992 | European Pat. Off. . |
| 3110094 | 9/1982 | Germany . |
| 2 267 341 | 12/1993 | United Kingdom . |

OTHER PUBLICATIONS

Patent Abstracts of Japan, vol. 006, No. 146 (M–147), Aug. 5, 1982 of JP 57–066037 A (Nippon Denso Co Ltd), Apr. 22, 1982.

Greenfield et al. "Using Microprocessors & Microcomputers", 1981.

Primary Examiner—Michael Shingleton
Attorney, Agent, or Firm—Sughrue, Mion, Zinn, Macpeak & Seas, PLLC

[57] ABSTRACT

A lighting circuit device of a discharge lamp for an automobile, has: a first circuit device for controlling lighting of the discharge lamp, the first circuit device including a microcomputer and an IC; and a second circuit device which is electrically connected to the first circuit device. At least one of the microcomputer and the IC controls the lighting of the discharge lamp according to a signal indicating a current and voltage intended for the discharge lamp, and the microcomputer generates information for driving the second circuit device on receiving internal or external information on the first circuit device.

13 Claims, 5 Drawing Sheets

VEHICULAR DISCHARGE LAMP LIGHTING CIRCUIT DEVICE FOR CONTROLLING A PLURALITY OF HEAD LAMP FUNCTIONS

BACKGROUND OF THE INVENTION

The present invention relates to a lighting circuit device for controlling the on-off of a lamp (e.g., a head lamp) mounted in an automobile.

A discharge-lamp lighting circuit device for an automobile of the sort mentioned above is designed to control the lighting of a discharge lamp for use as an head lamp. In the discharge-lamp lighting circuit device, DC voltage is boosted to a desired DC voltage, which is converted to AC voltage in a square wave form, and the discharge lamp is lighted by superposing a starting pulse on the AC voltage. After the discharge lamp is lighted, the quantity of light is regulated by controlling the operation of a booster circuit according to a signal indicating the current and voltage to be applied to the discharge lamp. While the current and voltage, and the battery voltage for the discharge lamp is being monitored, moreover, the control operation is stopped when any abnormality is detected. In order for the operation like this to be performed, a specific IC together with a discharge-lamp lighting circuit is provided in the automotive discharge-lamp lighting circuit device. In other words, a circuit built up in this specific IC is used for controlling the operation of the booster circuit and for performing a fail-safe operation when any abnormality occurs.

The present patent applicant considers letting a discharge-lamp lighting circuit device for an automobile have a leveling function for regulating light distribution in a head lamp, for example. More specifically, a leveling device for regulating light distribution in a head lamp as a second circuit device is electrically connected to the discharge-lamp lighting circuit device as a first circuit device, and sensor information from height sensors and a speed sensor is fed to the discharge-lamp lighting circuit device. Information on light distribution for the leveling device is created in this discharge-lamp lighting circuit device and the information on light distribution thus created therein is sent to the leveling device. In this case, it may be considered possible to incorporate the function of generating the information on light distribution for the leveling device into a specific IC but this question will have to be dealt with by changing the specific IC within the discharge-lamp lighting circuit device according to the car type because suspension hardness and the like make the information on light distribution variable with the car type.

SUMMARY OF THE INVENTION

An object of the present invention made to solve the forgoing problems is to provide a lighting circuit device for an automobile capable of retaining a leveling function for regulating light distribution in a head lamp and other functions by dealing with providing such a lighting circuit device without changing a specific IC in a first circuit device according to the car type.

In order to accomplish the object above, according to a first aspect of the invention, a microcomputer is installed in a first circuit device and at least one of the microcomputer and an IC is used for controlling the lighting of a discharge lamp and further information for driving a second circuit device is generated by the microcomputer. According to this invention, the information for driving the second circuit device is generated by the microcomputer in the first circuit device.

According to a second aspect of the present invention, the second circuit device is a leveling device for regulating light distribution in a head lamp and information on light distribution for the leveling device is generated by the microcomputer in the first invention. The information on light distribution for the leveling device is generated by the microcomputer in the first circuit device.

According to a third aspect of the invention, a third circuit device is electrically connected to the first circuit device and the third circuit device is a cleaner device for sending jets of cleaning liquid to the head lamp and further information on a jet amount of cleaning liquid for the cleaner device is generated by the microcomputer in the first or second invention. Information on the jet amount of cleaning liquid for the cleaner device is generated by the microcomputer in the first circuit device.

According to a fourth aspect of the invention, a fourth circuit device is electrically connected to the first circuit device and the fourth circuit device is a cornering lamp device for controlling an irradiation angle with respect to the horizontal direction of a lighting apparatus such as a head lamp during the traveling of an automobile on a curved road and further control information for the cornering lamp device is generated by the microcomputer in the first to third invention. The control information for the cornering lamp device is generated by the microcomputer in the first circuit device.

According to a fifth aspect of the invention, the information generated by the microcomputer is sent to the second circuit device in the first to fourth invention. According to this invention, the information (information on light distribution) generated by the microcomputer is sent to the second circuit device (leveling device).

According to a sixth aspect of the invention, the microcomputer is mainly used for low-speed processing to control the circuit device and the IC is mainly used for high-speed processing in the first to fifth invention. According to this invention, the microcomputer mainly performs the low-speed processing (control of judging the optimum state of the circuit device) and the IC mainly performs the high-speed processing (the fail-safe operation of determining whether or not the input information is appropriate).

According to a seventh aspect of the invention, the microcomputer effects the optimum power control of an illuminating lamp and the IC detects the abnormality of the automotive lighting circuit in the first and sixth invention. According to this invention, the optimum power control of the illuminating lamp (discharge lamp) is effected by the microcomputer and the abnormality of the automotive lighting circuit (discharge-lamp lighting circuit) is detected by the IC.

According to an eighth aspect of the invention, information for the microcomputer from the outside is also made to branch off to the IC in order to detect the abnormality of various sensors to which the information is supplied in the first to seventh invention. The information for the microcomputer from the outside is also made to branch off to the IC in order to detect the abnormality (disconnection, etc.) of various sensors.

According to a ninth aspect of the invention, trouble/abnormality diagnostic information or trouble/abnormality foreseeing information is sent from the first circuit device to the outside in the first to eighth invention.

DETAILED DESCRIPTION OF THE PREFERRED EMBODIMENTS

A detailed description will subsequently be given of embodiments of the present invention.

Embodiment 1

Figure 1:
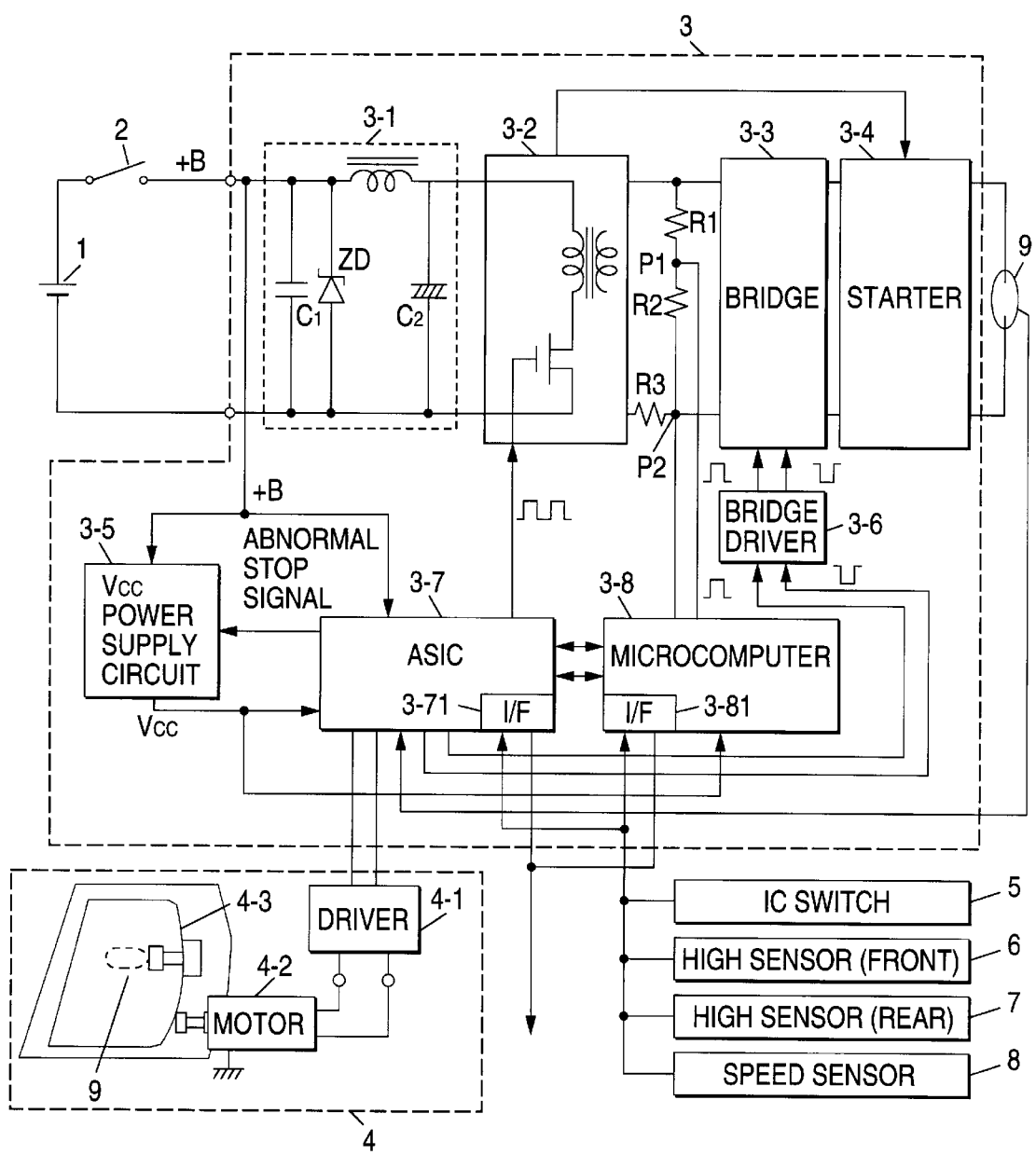
FIG. 1 is a diagram showing an embodiment 1 of a lighting circuit device of an automobile according to the present invention.

FIG. 1 is a diagram illustrating a lighting circuit device for an automobile embodying the present invention. In FIG. 1, reference numeral 1 denotes a vehicle battery; 2, a lighting switch; 3, a discharge-lamp lighting circuit device; 4, a leveling device; 5, an ignition switch; 6, a height sensor (front); 7, a height sensor (rear); 8, a speed sensor; and 9, a discharge lamp.

The lighting circuit device 3 is equipped with a filter circuit 3-1, a DC—DC converter (booster circuit) 3-2, resistors R1–R3, a bridge circuit (inverter) 3-3, a starter circuit 3-4, a power supply circuit 3-5, a bridge driver 3-6, an ASIC (Application Specific Integrated Circuit) 3-7 as a specific IC and a microcomputer 3-8.

The microcomputer 3-8 is provided with, in addition to an interface 3-81 for exchanging signals with the outside, (though not shown) an A/D converter for converting an analog signal input into an internal digital signal, a CPU for performing the basic functions, a memory, a D/A converter for converting the internal digital signal into an analog signal output and so forth.

The leveling device 4 is electrically connected to the lighting circuit device 3 and equipped with a driver 4-1, a motor 4-2 and a reflector 4-3. As the motor 4-2 turns, the reflector 4-3 is obliquely moved in the vertical direction, whereby light distribution in the discharge lamp 9 is regulated.

Discharge-lamp Lighting Operation In The Lighting Circuit Device 3

When the lighting switch 2 is turned on, supply voltage +B is supplied from the vehicle battery 1 to the lighting circuit device 3. The supply voltage +B is supplied via the filter circuit 3-1 to the DC—DC converter 3-2. Moreover, Vcc is supplied via the power supply circuit 3-5 to the ASIC 3-7 and the microcomputer 3-8.

The DC—DC converter 3-2 boosts the supply voltage (DC voltage) +B supplied via the filter circuit 3-1 according to a control signal from the ASIC 3-7 and supplies the boosted DC voltage to the bridge circuit 3-3. The bridge circuit 3-3 converts the DC voltage from the DC—DC converter 3-2 into AC voltage in a square wave form according to the control signal applied from the ASIC 3-7 via the bridge driver 3-6 and supplies the AC voltage to the starter circuit 3-4. The starter circuit 3-4 lights the discharge lamp 9 by superposing a starting pulse on the AC voltage from the bridge circuit 3-3.

After lighting the discharge lamp 9, the starter circuit 3-4 inputs to the microcomputer 3-8 the voltage (=a lamp voltage signal) generated at the node P1 between the resistors R1, R2 and the voltage (=a lamp current signal) at the node P2 between the resistors R2, R3 in order to effect the optimum power control of the discharge lamp 9. More specifically, the optimum power signal generated by the microcomputer 3-8 is sent to the ASIC 3-7, which uses this signal together with the lamp voltage signal and the lamp current signal to bring the DC—DC converter 3-2 under high-speed control.

[Fail-safe Operation In The Lighting Circuit Device 3]

On the other hand, the ASIC 3-7 monitors the signal indicating the current and voltage applied to the discharge lamp 9 and the supply voltage +B applied to the power supply circuit 3-5 during the time the lighting of the discharge lamp 9 is controlled by the microcomputer 3-8.

More specifically, whether or not the above signal is within the range of proper values is decided by comparison in the ASIC 3-7 and in a case where the signal is not within that range, processing appropriate for the signal is performed. When the signal indicates the short-circuiting of the circuit device, for example, an abnormality stop signal is immediately sent from the ASIC 3-7 to the power supply circuit 3-5.

In the case of a signal indicating the fact that the lamp voltage has deviated from a rated value, for example, the ASIC 3-7 or the microcomputer 3-8 measures a monitor time fit for the signal and makes a judgment about the signal and besides sends the abnormality stop signal to the power supply circuit 3-5 when the signal is judged abnormal.

When the abnormality stop signal is sent to the power supply circuit 3-5 the supply voltage Vcc directed to the ASIC 3-7 and the microcomputer 3-8 is cut off and then the operation of controlling the lighting of the discharge lamp 9 is suspended. Moreover, the ASIC 3-7 monitors the mounting condition of the discharge lamp 9 and when the discharge lamp 9 is detached, the abnormality stop signal is sent to the power supply circuit 3-5.

[Formation Of Information On Light Distribution For The Leveling Device 4 In The Lighting Circuit Device 3]

The microcomputer 3-8 receives sensor information from ignition switch 5, the height sensors 6, 7 and the speed sensor 8 as what is brought in from the outside and creates information on light distribution for the leveling device 4.

Figure 2:
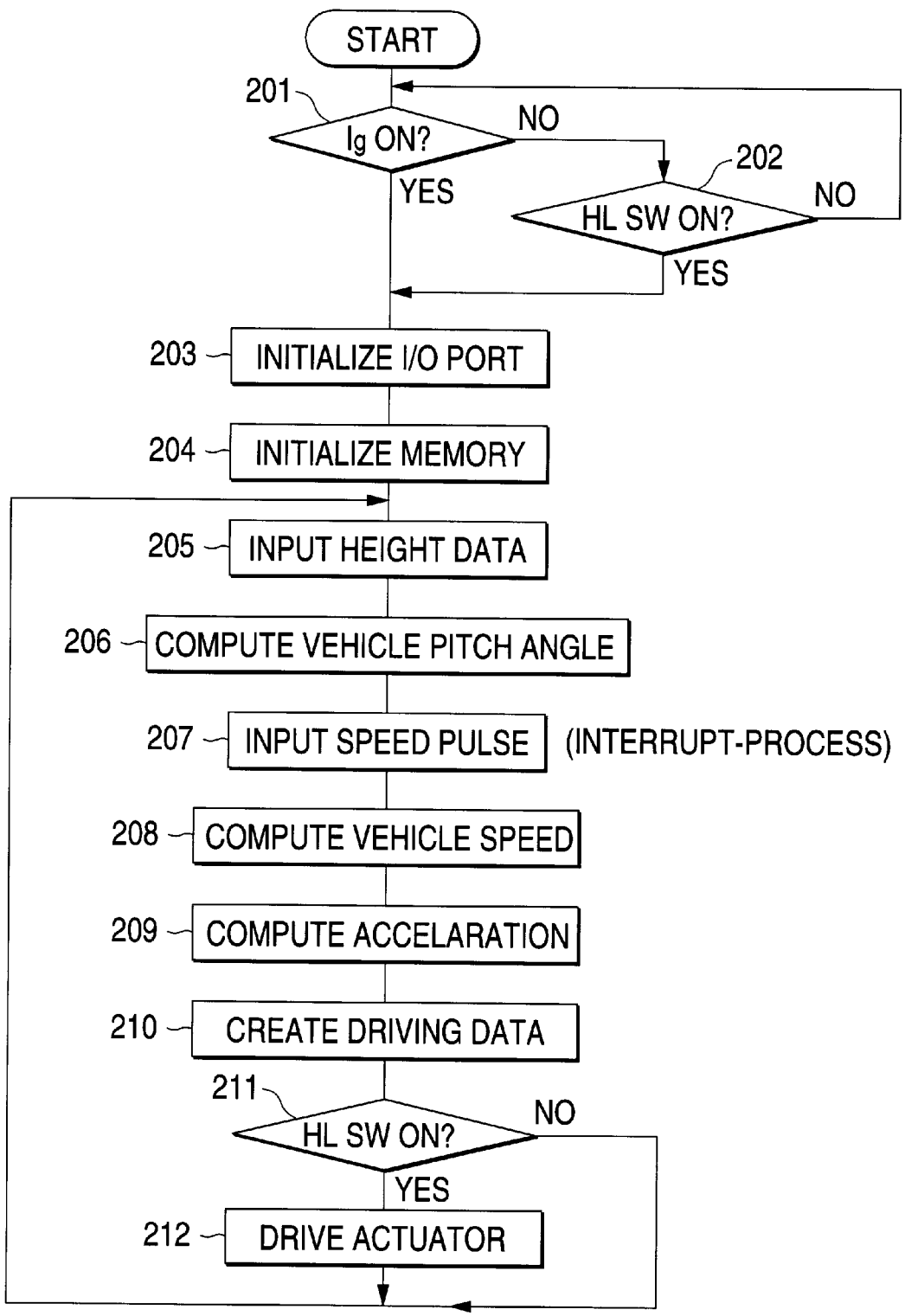
FIG. 2 is a flowchart illustrative of the operation of controlling a leveling device performed by a microcomputer in the lighting circuit device.

More specifically, the microcomputer 3-8 checks out whether or not the ignition switch 5 is in an ON state (Step 201 of FIG. 2) and if the ignition switch 5 is in the ON state, immediately follows Step 203 and if it is not in the ON state, then follows Step 203 on confirming the ON state of the lighting switch 2.

Subsequently, the microcomputer 3-8 performs "I/O port initialization" at Step 203 and then "memory initialization" at Step 204. Further, the microcomputer 3-8 receives sensor information from the height sensors 6, 7 as height data (Step 205) and carries out "computation of a vehicle pitch angle (inclination of the vehicle)" (Step 206). Further, the microcomputer 3-8 receives sensor information (speed pulse) from the speed sensor 8 (Step 207) and carries out "computation of vehicle speed" and "computation of acceleration" according to the speed pulse (Step 208, Step 209).

The microcomputer 3-8 creates driving data, that is, information on light distribution according to the pitch angle, the speed and the acceleration obtained through the computation above (Step 210). The information on light distribution is made obtainable by designating a car type for the microcomputer 3-8 as what corresponds to the car type thus designated. In other words, constants for creating the car-to-car type information on light distribution have been stored in the memory of the microcomputer 3-8, so that the constant corresponding to the car type thus designated is used for creating such information on light distribution.

On confirming that the lighting switch 2 is in the ON state (Step 211), the microcomputer 3-8 sends the information on light distribution thus created to the leveling device 4 via the ASIC 3-7 (Step 212). The leveling device 4 drives the motor 4-2 via the driver 4-1 in accordance with the information on light distribution sent through the ASIC 3-7. In consequence, the reflector 4-3 obliquely moves, thus having the light distribution in the discharge lamp 9 adjusted to an optimum position.

According to this embodiment of the invention, moreover, the sensor information intended for the microcomputer 3-8 from the outside, that is, the sensor information derived from the ignition switch 5, the height sensors 6, 7 and the speed sensor 8 is made to branch off to the ASIC 3-7. The ASIC 3-7 detects the abnormality (disconnection, etc.) of the ignition switch 5, the height sensors 6, 7 and the speed sensor 8 on the basis of the sensor information and outputs the detected abnormality of the ignition switch 5, the height sensors 6, 7 and the speed sensor 8 to the outside via an interface 3-71.

In combination with an abnormality stop signal to be sent to the power supply circuit 3-5, that is, the fail-safe operation in the lighting circuit device 3, the ASIC 3-7 outputs the then abnormality information (a trouble/abnormality diagnostic signal indicative of trouble in the lighting circuit device 3 and the leveling device 4) to the outside via the interface 3-71. Further, the ASIC 3-7 detects the life terminal state of the discharge lamp 9 (a trouble-abnormality foreseeing signal) outputs the detected result to the outside via the interface 3-71. It is thus possible to prompt the replacement of the discharge lamp 9 before the lamp is used up. The ASIC 3-7 also acts as a watchdog over the microcomputer 3-8. Like the ASIC 3-7, the microcomputer 3-8 outputs various items of information to the outside via the interface 3-81.

As is obvious from the description given above, according to this embodiment of the invention, it becomes unnecessary to change the ASIC 3-7 for each car type since information on light distribution in a desired car type is made available by designating the car type for the microcomputer 3-8.

According to this embodiment of the invention, the microcomputer 3-8 is mainly used to control the first or second circuit device so as to judge its optimum state, that is, used for low-speed processing. Further, the ASIC 3-7 is mainly used for the fail-safe operation to determine whether or not the input information is appropriate, that is, for high-speed processing. Thus, the number of peripheral parts is decreased by subjecting the functions of the lighting circuit device 3 and the leveling device 4 to split processing in order to match their functions with the performance of the microcomputer 3-8 as well as the ASIC 3-7, which contributes to reducing the size and cost of the lighting circuit device to a greater extent.

Although it has been arranged that the sensor information from the ignition switch 5, the height sensors 6, 7 and the speed sensor 8 are fed into the microcomputer 3-8 as sensor information from the outside according to this embodiment of the invention, it may be supplied with set information on the position of light distribution by means of a manual switch.

Although it has also been arranged that the lighting of the discharge lamp 9 is controlled by the microcomputer 3-8 via the ASIC 3-7, the microcomputer 3-8 or otherwise the ASIC 3-7 may be used to directly control the lighting of the discharge lamp 9.

Although it has further been arranged that the information on light distribution that has been created by the microcomputer 3-8 is sent via the ASIC 3-7 to the leveling device 4, the information may be sent thereto directly from the microcomputer 3-8.

Embodiment 2

Figure 3:
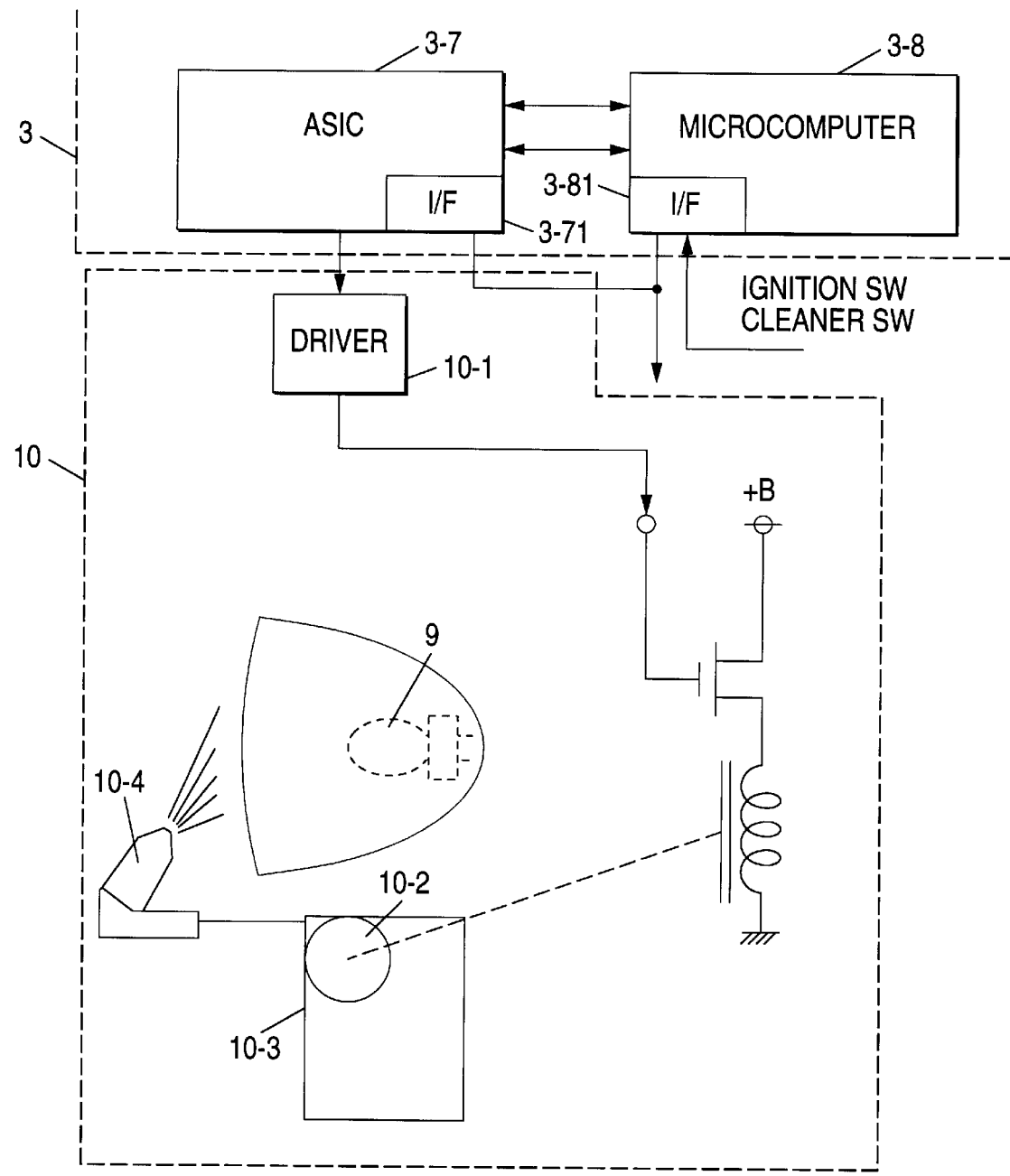
FIG. 3 is a diagram showing an embodiment 2 of a lighting circuit device with, in place of the leveling t device, a cleaner device connected thereto.

The leveling device 4 has been made a second circuit device in Embodiment 1. However, a cleaner device for sending jets of cleaning liquid to a head lamp is made a second circuit device in Embodiment 2. More specifically, a cleaner device 10 in place of the leveling device 4 is installed as shown in FIG. 3. In this case, an ON signal (staring signal) from a cleaner switch (not shown) and an ON signal from an ignition switch 5 are applied to a microcomputer 3-8 as information from the outside.

Figure 4:
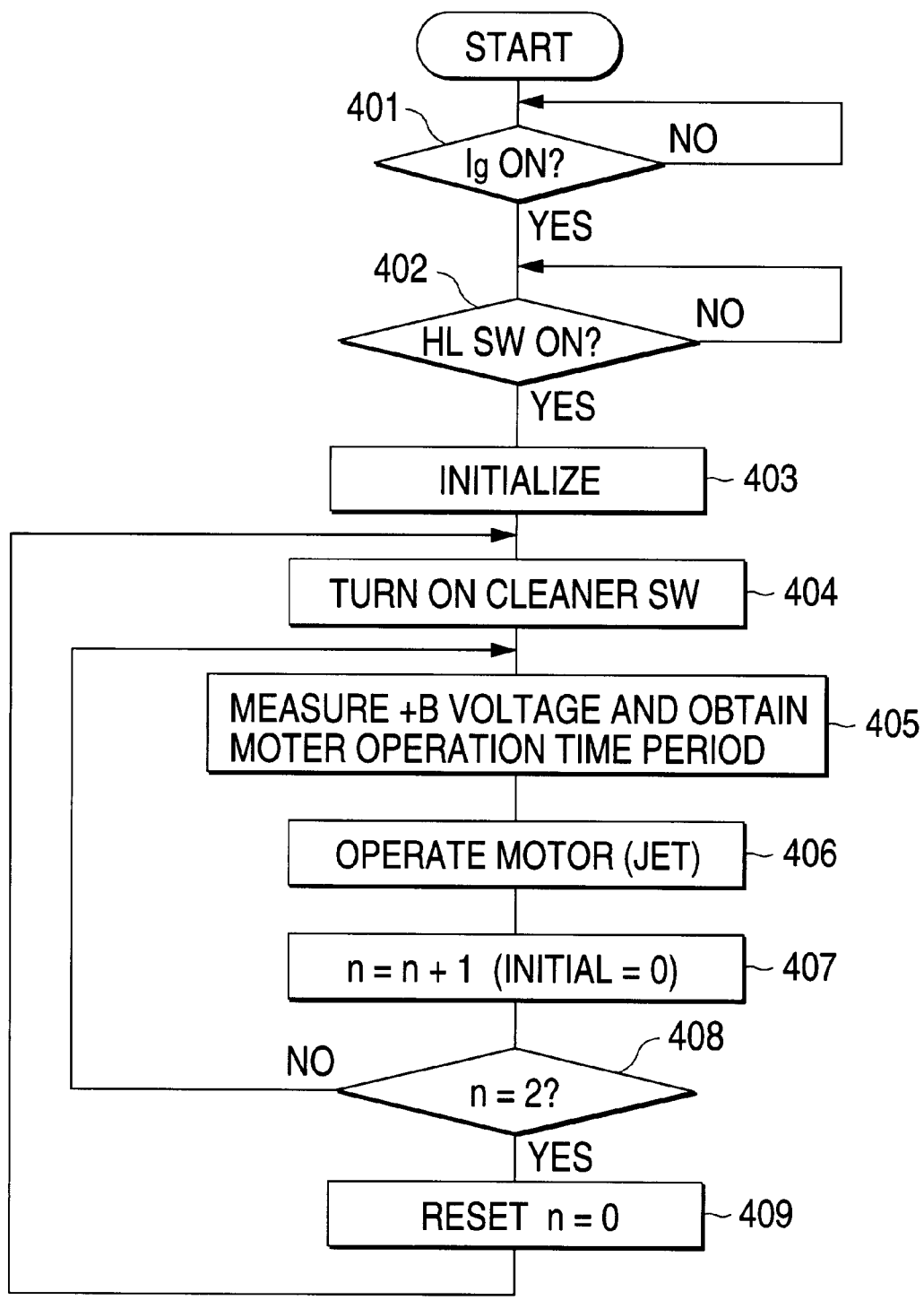
FIG. 4 is a flowchart illustrative of the operation of controlling the cleaner device performed by a microcomputer in the lighting circuit device.

The microcomputer 3-8 checks out whether or not the ignition switch 5 is in the ON state (Step 401 of FIG. 4) and if the ignition switch 5 is in the ON state, checks out whether or not a lighting switch 2 is in the ON state (Step 402). If the ignition switch 5 and the lighting switch 2 are both in the ON state, "initialization" is carried out (Step 403).

When the cleaner switch is turned on (Step 404), the microcomputer 3-8 comes to know supply voltage +B according to information from an ASIC 3-7 and computes a motor operating time corresponding to the supply voltage +B. In other words, a constant jet amount is obtainable at all timed by changing the motor operating time in proportion to the supply voltage +B. In this case, the motor operating time corresponding to the supply voltage +B varies with the car type. For example, the motor operating time corresponding to the supply voltage +B is varied because a cleaning liquid tank capacity varies with the car type.

The motor operating time with respect to the supply voltage +B is obtainable by designating a car type for the microcomputer 3-8 as what corresponds to the designated car type. In other words, characteristics of the motor operating time with respect to the supply voltage +B have been stored in the memory of the microcomputer 3-8 on a car type basis, so that the motor operating time having characteristics corresponding to the car type thus designated is obtainable.

With the motor operating time thus obtained as information on the jet amount of cleaning liquid, the microcomputer 3-8 sends the information via the ASIC 3-7 to the cleaner device 10 (Step 406). The cleaner device 10 drives a motor 10-2 via a driver 10-1 in accordance with the information on the jet amount supplied via the ASIC 3-7, whereby the cleaning liquid in a tank 10-3 is jetted out through a nozzle 10-4 with the effect of cleaning (first cleaning) the surface of a lens placed at the front of a discharge lamp 9.

After the first cleaning, the microcomputer 3-8 returns to Step 405 in response to NO of "n=2?" at Step 408 with n=n+1 (Step 407) and obtains a motor operating time corresponding to supply voltage +B as in the preceding case. Further, the microcomputer 3-8 proceeds to Step 409 in response to YES of "n=2? at Step 408 with n=n+1 and resets n=0 in preparation for the ON state of the cleaner switch next time.

Embodiment 3

Figure 5:
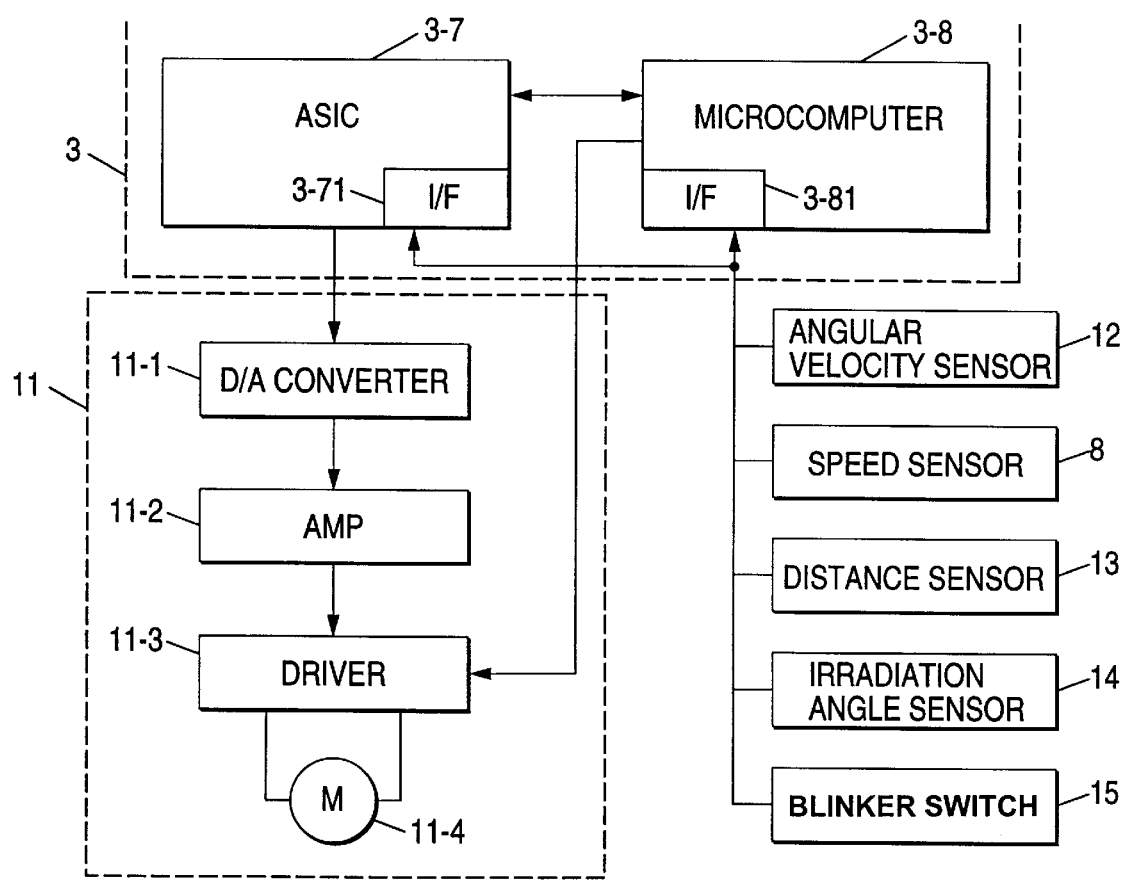
FIG. 5 is a diagram showing an embodiment 3 of a lighting circuit device with, in place of the leveling device, a cornering lamp device connected thereto.

The leveling device 4 has been made a second circuit device in Embodiment 1. However, a cornering lamp device for controlling an irradiation angle with respect to the horizontal direction of a head lamp during the traveling of an automobile on a curved road is made a second circuit device. More specifically, a cornering lamp device 11 in place of the leveling device 4 is installed as shown in FIG. 5. In this case, a microcomputer 3-8 is supplied with sensor information from an angular velocity sensor 12, a speed sensor 8, a distance sensor 13, an irradiation angle sensor 14 and a blinker switch 15 as information from the outside.

The microcomputer 3-8 computes an angular velocity $\omega_{new}$ during traveling on a curved road according to an output from the angular velocity sensor 12, and measures a speed v according to a distance pulse from the distance sensor 13 or a signal from the speed sensor 8. Further, the microcomputer 3-8 computes a reciprocal number of a turning radius r by dividing the angular velocity $\omega_{new}$ by the speed v and multiplying the reciprocal of the turning radius r by a constant K to obtain a target value θs of an irradiation angle. In the case of a leftward blinker upon confirmation of the ON state of the blinker switch 15, the target value θs of the irradiation angle is maximized in the left-hand direction. In the case of rightward blinker, the target value θs of the irradiation angle is-maximized in the right-hand direction. This process has already been proposed by the present patent applicant in Japanese Patent Application Laid-open No. Hei. 5-349261.

Then a deviation of the present irradiation angle θv given by the distance sensor 13 from the target value θs is obtained and the deviation as control information is sent via the ASIC 3-7 to the cornering lamp device 11. The cornering lamp device 11 drives a motor 11-4 via a D/A converter 11-1, an amplifier 11-2 and a driver 11-3 in conformity with the control information sent via the ASIC 3-7. Thus, a reflector installed on the back of a discharge lamp 9 turns horizontally, so that the irradiating direction of the head lamp is directed to a target.

According to this embodiment of the invention, the sensor information for the microcomputer 3-8 from the outside, that is, the sensor information derived from the angular velocity sensor 12, the speed sensor 8, the distance sensor 13, the irradiation angle sensor 14 and the blinker switch 15 is made to branch off to the ASIC 3-7. The ASIC 3-7 detects the abnormality (disconnection, etc.) of the angular velocity sensor 12, the speed sensor 8, the distance sensor 13, the irradiation angle sensor 14 and the blinker switch 15 on the basis of the sensor information and outputs the detected abnormality of the angular velocity sensor 12, the speed sensor 8, the distance sensor 13, the irradiation angle sensor 14 and the blinker switch 15 to the outside via an interface 3-71. Moreover, the ASIC 3-7 outputs a trouble. abnormality diagnostic signal indicative of trouble in a lighting circuit device 3 and the cornering lamp device 11 to the outside via the interface 3-71.

Although the cleaner device 10 and the cornering lamp device 11 in place of the leveling device 4 are to be installed according to Embodiments 1–2 of the invention, the leveling device 4, the cleaner device 10 and the cornering lamp device 11 may be connected in parallel to the lighting circuit device 3; in other words, they may be connected to the lighting circuit device 3 by making the leveling device 4, the cleaner device 10 and the cornering lamp device 11 a second circuit device, a third circuit device and a fourth circuit device, respectively. In this case, the combination of the leveling, cleaning and cornering functions results in promoting a decrease in size and cost, thus furthering the integration of a lamp system. This also contributes to reducing assembly work on the part of car manufacturers, and increasing improvement in reliability.

As is obvious from the description given above, the leveling function for regulating the light distribution in the head lamp and other functions can be retained in the lighting circuit device without changing the specific IC in the first circuit device according to the car type since the microcomputer is installed in the first circuit device and employed for creating information for use in driving the second circuit device.

What is claimed is:

1. A lighting circuit device of a discharge lamp for an automobile, comprising:
   a first circuit device for controlling lighting of the discharge lamp, said first circuit device including a microcomputer and an IC; and
   a second circuit device which is electrically connected to said first circuit device, said second circuit device controlling a function of the discharge lamp other than lighting;
   wherein at least one of said microcomputer and said IC controls the lighting of the discharge lamp according to a signal indicating a current and voltage intended for the discharge lamp, and said microcomputer generates driving information for driving said second circuit device upon receiving information from a source internal to said first circuit device or information from a first source external to said first circuit device.

2. The lighting circuit device according to claim 1, wherein said second circuit device includes a leveling device for regulating light distribution and wherein the microcomputer generates information on light distribution upon receiving the information from said first source external to said first circuit device.

3. The lighting circuit device according to claim 1, wherein said second circuit device is electrically connected to said first circuit device, wherein said second circuit device includes a cleaner device for sending jets of cleaning liquid to a head lamp, and wherein said microcomputer generates information on a jet amount of cleaning liquid for said cleaner device upon receiving a starting signal.

4. The lighting circuit device according to claim 1, wherein said second circuit device is electrically connected to said first circuit device, wherein said second circuit device includes a cornering lamp device for controlling an irradiation angle with respect to the horizontal direction of a lighting apparatus such as a head lamp during the traveling of an automobile on a curved road, and wherein said microcomputer generates control information for the cornering lamp device on receiving information such as angular velocity and vehicle speed.

5. The lighting circuit device according to claim 1, wherein the driving information generated by said microcomputer is sent via said IC to said second circuit device.

6. The lighting circuit device according to claim 1, wherein said microcomputer is mainly used for low-speed processing to control said lighting circuit device so as to judge its optimum state and wherein said IC is mainly used for high-speed processing such as a fail-safe operation to determine whether or not the input information is appropriate.

7. The lighting circuit device according to claim 1, wherein said microcomputer effects optimum power control of an illuminating lamp according to a signal indicating the current and voltage to be applied to the illuminating lamp and wherein said IC detects an abnormality of said lighting circuit according to a signal from said microcomputer and battery voltage.

8. The lighting circuit device according to claim 1, wherein the information from the first source external to said first circuit device is provided by at least one sensor and is input to said IC, in addition to said microcomputer, in order for said IC to detect an abnormality of said at least one sensor.

9. The lighting circuit device according to claim 1, wherein trouble/abnormality diagnostic information or trouble/abnormality foreseeing information is sent from said first circuit device to a second source external to said first circuit.

10. The lighting circuit device according to claim 1, wherein the information from the first source external to said first circuit device is input manually.

11. The lighting circuit device according to claim 1, wherein the information from the first source external to said first circuit device includes a vehicle height and vehicle speed.

12. The lighting circuit device according to claim 1, wherein a memory associated with said microcomputer is stored with one or more values relating vehicle type, in conjunction with the information received from the source internal to said first circuit device or the information received from the first source external to said first circuit device.

13. A lighting circuit device of a discharge lamp for an automobile, comprising:

a first circuit device for controlling lighting of the discharge lamp, said first circuit device including a microcomputer and an IC;

a second circuit device which is electrically coupled to said first circuit device, said second circuit device including a leveling device for regulating light distribution of the discharge lamp;

a third circuit device which is electrically connected to said first circuit device, said third circuit device including a cleaner device for sending jets of cleaning liquid to the discharge lamp; and a fourth circuit device which is electrically coupled to said first circuit device, said fourth circuit device including a cornering lamp device for controlling an irradiation angle of the discharge lamp;

wherein at least one of said microcomputer and said IC controls the lighting of the discharge lamp according to a signal indicating a current and voltage intended for the discharge lamp, and said microcomputer generates driving information for driving each of said second circuit device, said third circuit device, and said fourth circuit device upon receiving information from a source internal to said first circuit device or information from a source external to said first circuit device.

* * * * *